United States Patent [19]
Halimi et al.

[11] Patent Number: 6,029,452
[45] Date of Patent: Feb. 29, 2000

[54] CHARGE AIR SYSTEMS FOR FOUR-CYCLE INTERNAL COMBUSTION ENGINES

[75] Inventors: Edward M. Halimi, Montecito; William E. Woollenweber, Carlsbad, both of Calif.

[73] Assignee: Turbodyne Systems, Inc., Carpinteria, Calif.

[21] Appl. No.: 08/939,958

[22] Filed: Sep. 29, 1997

Related U.S. Application Data

[63] Continuation-in-part of application No. PCT/US96/17356, Oct. 28, 1996, and a continuation-in-part of application No. 08/559,424, Nov. 15, 1995, abandoned.

[51] Int. Cl.[7] .................................................. F02B 37/10
[52] U.S. Cl. ............................... 60/612; 123/565; 60/608
[58] Field of Search ........................... 60/607, 608, 612; 123/565

[56] References Cited

U.S. PATENT DOCUMENTS

| | | |
|---|---|---|
| 4,453,381 | 6/1984 | Dinger ........................................ 60/612 |
| 4,901,530 | 2/1990 | Kawamura ................................. 60/608 |
| 4,955,199 | 9/1990 | Kawamura ................................. 60/608 |
| 5,577,385 | 11/1996 | Kapich ....................................... 60/612 |

FOREIGN PATENT DOCUMENTS

| | | |
|---|---|---|
| 312107 | 4/1989 | European Pat. Off. . |
| 57-212331 | 12/1982 | Japan . |
| 58-222919 | 12/1983 | Japan . |
| 267149 | 8/1927 | United Kingdom . |

Primary Examiner—Michael Koczo
Attorney, Agent, or Firm—Brinks Hofer Gilson & Lione

[57] ABSTRACT

Charge air systems may include a small electric motor-driven compressor for supplying charge air to four-cycle internal combustion engines, including systems with turbocharger charge air compressors in series and parallel connection. The disclosed charge air systems can provide an effective charge air flow path to the internal combustion engine and avoids air flow restrictions at high engine operating speeds.

4 Claims, 4 Drawing Sheets

CHARGE AIR SYSTEMS FOR FOUR-CYCLE INTERNAL COMBUSTION ENGINES

This is a continuation-in-part of PCT International patent application Serial No. PCT/US96/17356 filed Oct. 28, 1996, which designates the United States and is a continuation-in-part of U.S. patent application Ser. No. 08/559,424 filed Nov. 15, 1995, abandoned.

TECHNICAL FIELD

This invention is directed to methods and apparatus for delivering charge air to a four-cycle internal combustion engine.

BACKGROUND ART

The use of turbochargers to increase power output and decrease fuel consumption in four-cycle internal combustion engines is common practice today. Both spark ignition and diesel engines use turbochargers to advantage and, in the case of diesel engines, the power output of an engine of a given cylinder displacement can easily be doubled by the addition of turbocharging with aftercooling. The turbocharger has gone through decades of development, and modern turbochargers used on high-speed diesel and gasoline engines are relatively low in cost and high in efficiency, and are durable commercial products.

Although the turbocharger utilizes exhaust gas energy that would otherwise be wasted, the imposition of an exhaust gas turbine in the engine exhaust system necessitates raising the average back pressure on the engine cylinders in order to generate sufficient pressure drop across the turbine to generate the power necessary to drive the turbocharger's compressor. This back pressure acts against the upstroke of the piston as it forces residual products of combustion out of the cylinder through the exhaust valves and increases the pumping loss of the engine. The level of back pressure caused by high pressure turbocharging of four-cycle engines is very high, even with the use of turbochargers that have relatively high overall efficiency. Any means that may be employed to lower the back pressure caused by the turbocharger turbine can result in significant improvement in engine performance. For example, if a diesel engine requires a pressure ratio of 2.5 times atmospheric pressure to reach the desired rated engine power output, a single turbocharger would impose a back pressure in the exhaust system of approximately two times atmospheric pressure.

The use of series turbochargers is common today on engines that are rated in high power output. If the two compressors are placed in series combination, the pressure ratios of the compressors are multiplied so high supercharge pressure can be supplied to the engine beyond that which a single turbocharger could produce by itself. If, for instance, a highly rated engine requires 4.5 pressure ratio, which is beyond the capability of a single commercial turbocharger, series turbochargers can provide a low pressure stage of 2.1 pressure ratio and a high pressure stage of 2.15 pressure ratio, the product of which is 4.51 pressure ratio overall. This, however, significantly raises the exhaust gas back pressure.

DISCLOSURE OF THE INVENTION

The invention is directed to charge air systems that may include a small electric motor-driven compressor for supplying charge air to four-cycle internal combustion engines, including systems with turbocharger charge air compressors in series and parallel connection. Charge air systems of the invention can provide an effective charge air flow path to the internal combustion engine that avoids the air flow restriction of a small charge air compressor and a need for its continuous operation to avoid the restriction effect of a small charge air compressor.

The invention permits the use of a small motor-driven compressor to provide charge air at engine speeds from idle to about 2000 to 2500 rpm without restricting charge air flow to the engine at high engine speeds, and permits such uses with a small motor-driven compressor in series and in parallel with a turbocharger compressor. The small motor-driven compressors used in this invention are compressors having an air output capacity that is incapable of supplying the charge air requirements of an internal combustion engine operating at high engine speeds, for example, in excess of about 2500 rpm, and would present an unacceptable restriction to charge air flow at such engine speeds in the absence of their operation. The invention permits the use of charge air compressors capable of supplying only a third, or less, of the charge air requirements of a four-cycle internal combustion engine operating at full rated speed.

A charge air system of the invention includes a small charge air compressor having an inlet and an outlet, an electric motor connected to drive the charge air compressor, a first charge air conduit connected with the outlet of the charge air compressor, a second charge air conduit and junction for the first and second charge air conduits, with the junction being connected with the intake manifold of a four-cycle internal combustion engine, and a charge air check valve located at, or upstream of, the junction for one of said first and second charge air conduits. In one preferred charge air system of the invention, the inlet of the small charge air compressor and the second conduit are connected with ambient atmosphere, preferably through an air cleaner, and the charge air check valve operates to close the second charge air conduit upon operation of the charge air compressor.

Another such charge air system of the invention provides two-stage compression with a turbocharger, having an exhaust gas driven turbine and a turbocharger compressor, driven by the exhaust gas driven turbine, with its air inlet connected with the junction and its compressed air outlet connected with the intake manifold of the internal combustion engine. In such preferred two-stage charge air systems, the turbocharger may be provided with an electric motor assisting the exhaust driven turbocharger turbine in driving the turbocharger compressor.

Another parallel operating charge air system of the invention includes a charge air compressor having an inlet and an outlet, an electric motor connected to drive the charge air compressor, a first charge air conduit connected with the outlet of the charge air compressor, a turbocharger having an exhaust gas driven turbine connected with the exhaust gas from a four-cycle engine and a turbocharger compressor having an air inlet and a compressed air outlet, a second charge air conduit connected with the compressed air outlet of the turbocharger compressor, a junction for said first and second charge air conduits, with the junction being connected with the air intake manifold of the four-cycle internal combustion engine, and a charge air check valve located at, or upstream of, the junction for one of said first and second charge air conduits. In preferred embodiments of such parallel operating charge air systems, the charge air check valve can close the second charge air conduit upon operation of the charge air compressor at low internal combustion engine speeds and close the first charge air conduit at high internal combustion engine speeds. Further, in such preferred charge air systems the turbocharger can include an electric motor assisting the exhaust gas driven turbocharger turbine in driving the turbocharger compressor.

Still another charge air system of the invention includes a charge air compressor having an inlet and an outlet, an electric motor connected to drive the charge air compressor, a turbocharger having an exhaust gas driven turbine connected with the exhaust gas from the four-cycle internal combustion engine and a turbocharger compressor having an air inlet and a compressed charge air outlet, a charge air cooler having its inlet connected with the compressed charge air outlet of said turbocharger compressor, a first charge air conduit connected with an outlet of the charge air cooler, a second charge air conduit connected with ambient atmosphere, a junction for the first and second charge air conduits, a third charge air conduit connecting the junction of the first and second charge air conduits with the air inlet of the charge air compressor, and a charge air check valve operable to open said second charge air conduit upon operation of said charge air compressor and to close the second charge air conduit upon operation of said turbocharger at high engine speeds. In such systems, the turbocharger may be provided with an electric motor assisting the exhaust gas turbine in driving the turbocharger compressor.

In charge air systems of the invention, an electric control can operate the motor driving the small charge air compressor in various modes for an improved supply of charge air to the internal combustion engine. The small motor-driven compressor may be energized by the control when acceleration from low engine speeds is desired and/or may be energized at a predetermined minimum speed to provide boost pressure with minimal delay at the engine intake manifold, reducing the response time of the internal combustion engine and the generation of harmful pollutants. The control can also operate any assisting electric motor that may be connected to assist the exhaust gas energy in driving a turbocharger compressor, and such controls generally energize, and super-energize, the motor assist of such turbochargers at low engine speeds.

The invention also provides a method of improving the performance of four-cycle engines by the use of a small motor-driven compressor. By utilizing an external power source to drive the small charge air compressor, the engine can be supercharged without imposing back pressure on the exhaust system as does a turbocharger, and an increase in charge air density can be achieved more rapidly, allowing fuel to be burned more efficiently, with the desirable result of less harmful pollutants emitted into the atmosphere in the engine exhaust.

The invention also provides a method of improving the performance of a turbocharger equipped engines by eliminating the time lag of the turbocharger compressor upon sudden throttle opening, by providing a small electrically powered charge air compressor which is connected supply charge air to the engine intake manifold.

Further features and advantages of the invention will be apparent from the drawings and more detailed description of currently best known modes and embodiments of the invention that follow.

BEST MODES FOR CARRYING OUT THE INVENTION

Figure 1:
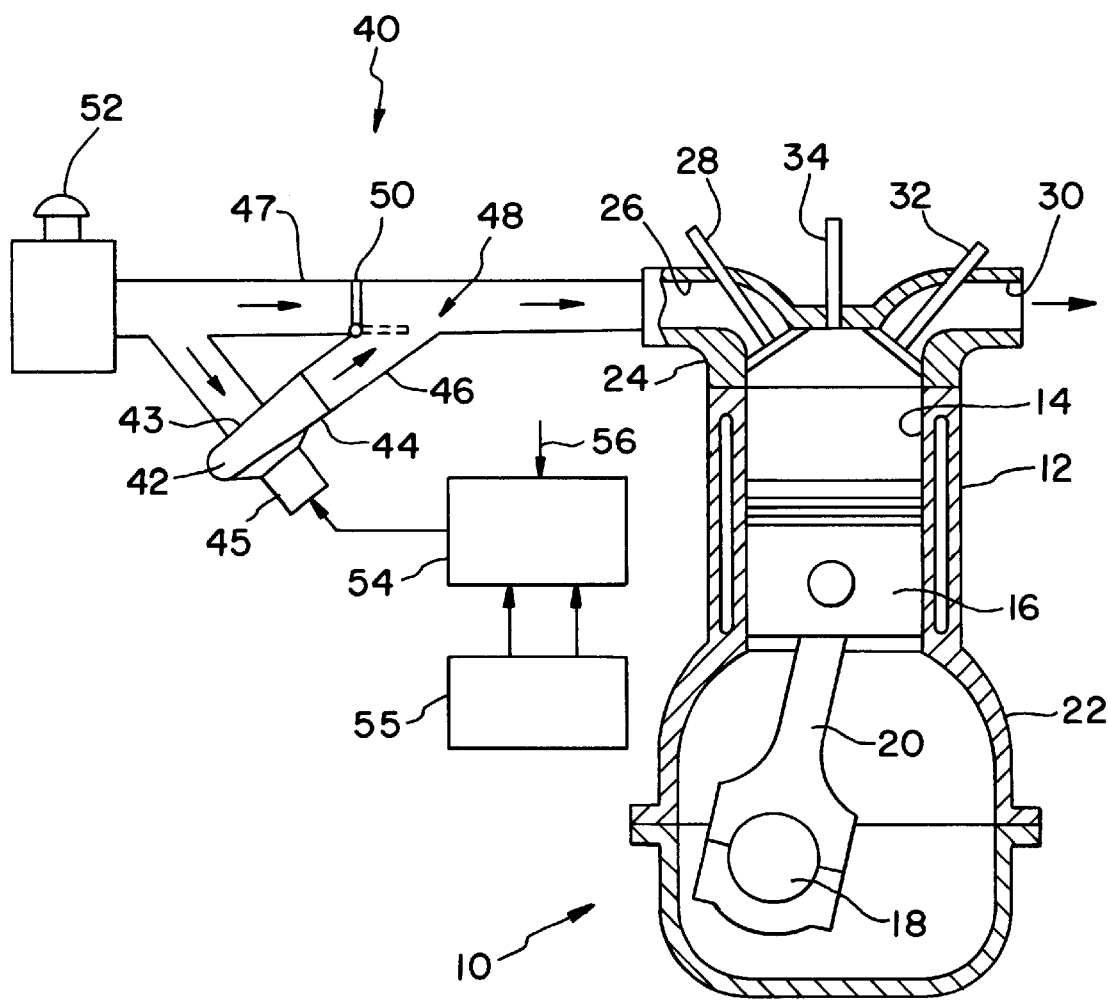
FIG. 1 shows schematically a first preferred embodiment of a charge air system of this invention for a four-cycle engine where charge air can be supplied from a small motor-driven compressor at low engine speeds and from ambient atmosphere at high engine speeds.

A conventional internal combustion engine is shown in schematic cross-section and is generally indicated at 10 in FIG. 1. The engine 10 has a cylinder block 12 in which is located cylinder 14. In this case, the cylinder has an upright axis. Piston 16 reciprocates up and down within the cylinder under control of crank 18. The crank rotates around the cranks axis and is connected to the piston by means of connecting rod 20. The crankshaft and connecting rod are housed in crankcase 22, which may contain oil for lubricating the lower part of the engine. There is usually a plurality of cylinders along the crankshaft axis.

The cylinders in the cylinder block are covered by cylinder head 24. The cylinder head has an intake manifold 26 forming a charge air inlet and carries intake valve 28, which controls flow of air or air plus fuel mix to the cylinder. The cylinder head 24 also has an exhaust gas outlet 30 for each cylinder. The exhaust gas outlet 30 is controlled by exhaust valve 32. The opening and closing of the intake valve and exhaust valve for each cylinder is coordinated with the movement of the piston by mechanical interconnection of the crankshaft with the cam shafts which control the valves. Fuel is introduced into the cylinder at the appropriate times through fuel injection nozzle 34. In some cases, the fuel may be delivered to the cylinder as a fuel-air mixture through the intake valve. By increasing the amount of air delivered to the cylinder and by a corresponding increase of fuel, the power output of the engine 10 can be appreciably increased; in addition, the engine efficiency can be increased to yield more work per unit of fuel.

FIG. 1 illustrates a charging system 40 of the invention for the four-cycle internal combustion engine 10. Charge air system 40 includes a small charge air compressor 42 having an inlet 43 and an outlet 44. An electric motor 45 is connected to drive the charge air compressor 42. A first charge air conduit 46 is connected with the outlet 44 of the charge air compressor 42. Charge air system 40 also includes a second charge air conduit 47 and a junction 48 for the first and second charge air conduits 46, 47. As shown in FIG. 1, junction 48 is connected with the intake manifold 26 of the internal combustion engine 10. The charge air system also includes a charge air check valve 50 located at (or possibly upstream of) the junction 48. The charge air check valve operates to close one of first charge air conduit 46 or second charge air conduit 47. As shown in FIG. 1, the charge air check valve 50 is operated by the air pressure created by charge air compressor 42 upon its operation to close the second charge air conduit 47, preventing back flow of charge air from junction 48 into air cleaner 52, and at high engine speeds charge air drawn through the second charge air conduit 47 by the internal combustion engine 10 operates the charge air check valve 50 to close the first charge air conduit 46, as indicated by the dashed lines of FIG. 1. Preferably, as shown in FIG. 1, the inlet 43 of the charge air compressor and the second conduit 47 are connected with an air cleaner 52.

A control 54 controls the application of electrical energy from an electrical power source 55 in response to signals 56 received from an engine speed sensor and/or from the internal combustion engine operator's acceleration control. In preferred control systems of the invention, the small motor-driven compressor 42 is energized by control 54 at engine speeds up to about 2000–2500 rpm. In the charge air system 40 of FIG. 1, the motor-driven compressor 42 can be maintained by control 54 at a predetermined minimum speed to provide boost pressure to the intake manifold 26 of the engine 10 in preparation for acceleration so that the desirable amount of air can be present in the engine cylinder 14 before additional fuel is injected when engine acceleration is called for. In addition, the electric motor 45 may be energized or super-energized upon receiving a signal from the engine acceleration control so that charge air and boost pressure can be rapidly increased when engine acceleration is called for. Because system 40 includes a small compressor, its transient time to reach high operating speeds and high boost pressures is significantly reduced and fuel can be burned more completely and the amount of harmful pollutants in the engine exhaust can be substantially lessened.

In the charge air system 40 of FIG. 1, the combination of the first charge air conduit 46 with a second charge air conduit 47 leading to ambient atmosphere through a check valve 50 avoids the restriction that may be otherwise imposed on the flow of charge air to the internal combustion engine 10 at high engine speeds, for example, speeds in excess of about 2000–2500 rpm because of the small size of compressor 42. In the charge air system 40, the small compressor 42 can be de-energized and the engine can draw its charge air requirements from ambient atmosphere, for example, through air cleaner 52, by means of the second conduit 47 and past the charge air check valve 50 which will be urged into a position (shown in dashed lines) opening the second conduit means 47 by the pressure of the charge air generated by the internal combustion engine.

The charge air system 40 of the invention thus permits an effective flow of charge air to the internal combustion engine 10 throughout its entire speed range and permits the use of a small motor-driven centrifugal compressor 42 that would impose an unacceptable restriction to engine air flow at higher internal combustion engine speeds.

The charge air system 40 allows the charge air compressor 42 to be made much smaller in size to match engine charge air requirements at only low speeds below about 2000 to 2500 rpm, and charge air systems of the invention can be more economical than prior art systems because of the smaller size of the centrifugal charge air compressor.

Figure 2:
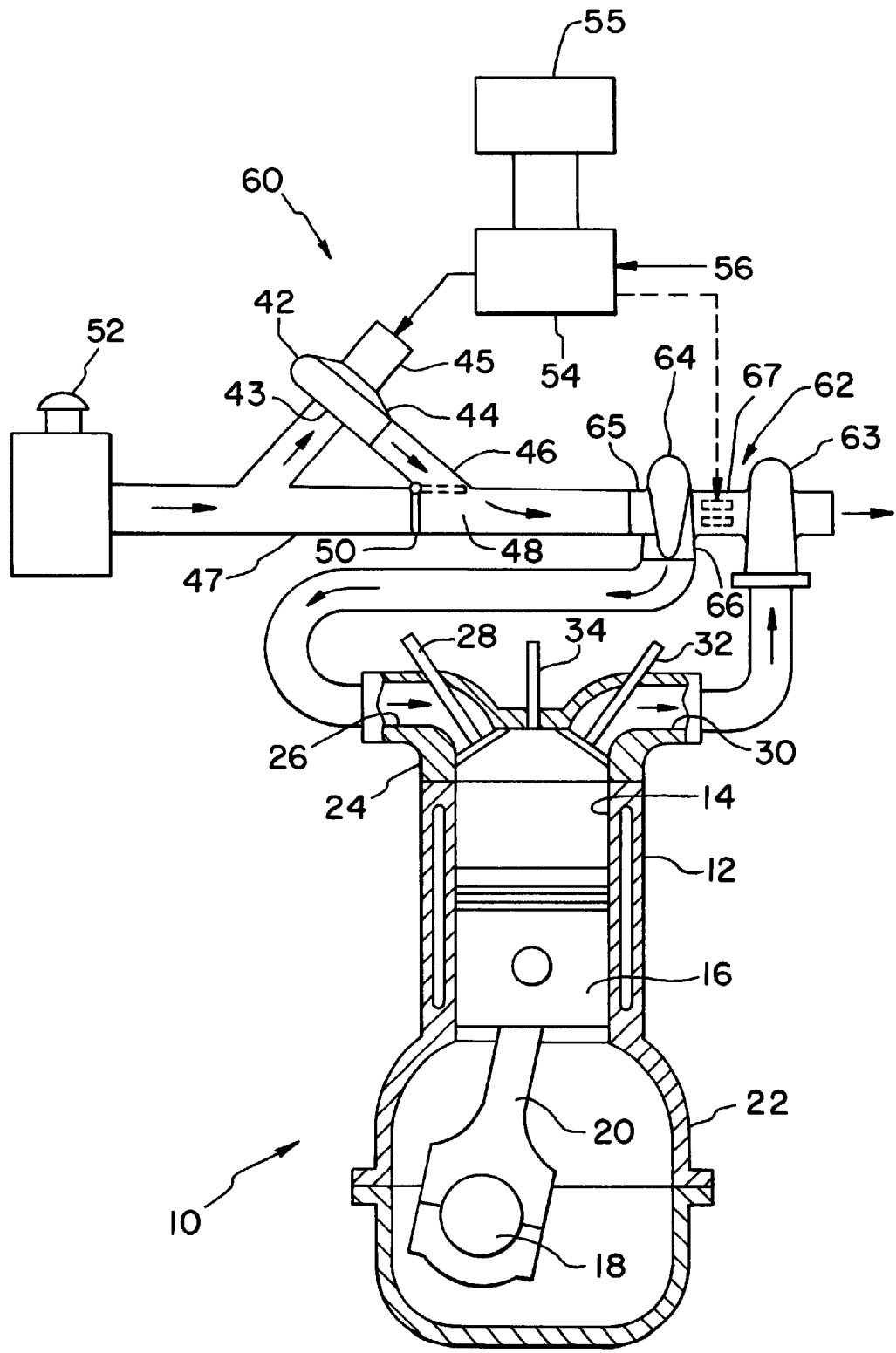
FIG. 2 shows schematically a second preferred embodiment of a charge air system of this invention for a four-cycle engine where two-stage charge air can be supplied from a small motor-driven compressor in series with a motor-assisted turbocharger compressor at low engine speeds and from the motor-assisted turbocharger alone at high engine speeds.

FIG. 2 illustrates a second preferred embodiment of charge air systems of the invention used with a four-cycle internal combustion engine 10. This four-cycle internal combustion engine 10 is as illustrated in FIG. 1 and described above. The charge air system 60 in FIG. 2 differs from that of FIG. 1 primarily by the inclusion of a turbocharger 62, including an exhaust gas driven turbine 63 connected with an exhaust outlet 30 of the internal combustion engine 10 and a turbocharger compressor 64 having an air inlet 65 and a compressed air outlet 66. In the preferred charge air system of FIG. 2, the turbocharger 62 also includes an electric motor 67 for assisting the exhaust gas driven turbine 63 in driving the turbocharger compressor 64. The charge air system of FIG. 2 further comprises a charge air compressor 42 having an inlet 43 and an outlet 44, and an electric motor 45 connected to drive the charge air compressor 42. A first charge air conduit 46 is connected with the outlet 44 of the charge air compressor 42. A second charge air conduit 47 extends from ambient atmosphere to a junction 48 for the first charge air conduit 46 and second charge air conduit 47. In the system of FIG. 2, the junction 48 is connected with the air inlet 65 of the turbocharger compressor 64. Like the charge air system 40 of FIG. 1, charge air system 60 of FIG. 2 includes a charge air check valve 50 located at, or located upstream of, the junction 48 for closing one of the first and second charge air conduits 46, 47.

The charge air system 60 of FIG. 2 is further provided with an electric control 54 which is operated by signals 56 from the internal combustion engine, such as from an engine speed sensor and/or the engine operator's acceleration control to energize the electric motor 45 and the electric motor 67 from the electric power source 55.

The charge air system of FIG. 2 can provide two-stage compression of the charge air for the internal combustion engine 10, particularly at low engine speeds when the electric motor 45 for charge air compressor 42 and the electric motor 67 of turbocharger 62 are both energized by the control 54. In such operation, ambient air is drawn to the inlet 43 of the charge air compressor 42 compressed by operation of the compressor 42 by the electric motor 45 and delivered through the first charge air conduit 46 to junction 48 where the pressure of the compressed air closes charge air check valve 50 and second charge air passageway 47, as shown in FIG. 2. The compressed charge air from charge air compressor 42 is conducted to the inlet 65 of the turbocharger compressor 64 where it is further compressed and delivered from the turbocharger compressor outlet 66 to the air inlet 26 of the internal combustion engine 10. Operation of the assisting electric motor 67 of the turbocharger 62 at low engine speeds, where the exhaust gas energy of the internal combustion engine is low, and the contemporaneous operation of the small charge air compressor 42 provides two-stage compression of the charge air to the internal combustion engine.

As known in the art, the pressure boost from the two-stage operation of charge air system 60 permits a pressure boost which is the product of the pressure ratio of charge air compressor 42 and the pressure ratio of turbocharger compressor 64. In the charge air system of FIG. 2, centrifugal compressor 42 has its compressed air outlet 44 connected with the air inlet 65 of the turbocharger compressor 64 to form a series connected compression system. The first stage centrifugal compressor 42 can be driven by the electric motor 45 at low engine speeds in response to input signals 56 such as from a boost pressure sensor and/or throttle sensor, but since first stage compressor 42 is not driven by an exhaust gas turbine, it does not raise the exhaust gas back pressure. In addition, first stage compressor 42 is a small compressor which can respond quickly in raising the boost pressure in response to signals 56 through the operation of electric motor 45. The result is a relatively uncomplicated two-stage charge air system providing enhanced boost pressures with reduced back pressure on the engine. For example, if a diesel engine requires a pressure ratio of 2.5 times atmospheric pressure to reach the desired rated engine power output, a single turbocharger would impose some back pressure on the exhaust system of approximately 2 times atmospheric pressure. However, in a charge air system 60 with the motor-driven compressor 42 in series with the turbocharger compressor 64, the required pressure ratio of 2.5 can be achieved by producing a 1.3 pressure ratio from the motor-driven compressor 42 and a 1.92 pressure ratio from the turbocharger compressor 64, and the charging pressure ratio of turbocharger compressor 64 can be reduced from 2.5 to 1.92 resulting in a reduction of exhaust back pressure to approximately 1.5 times atmospheric pressure. This significantly reduces the pumping loss of the internal combustion engine 10 resulting in lower fuel consumption, higher power output or both, and decreased exhaust gas pollution.

Furthermore, the operation of the charge air system shown in FIG. 2 can be enhanced by the addition and use of an assisting electric motor 67 and a turbocharger 62. The assisting electric motor 67 for turbocharger 62 can be energized by the control means 54 in response to appropriate input signals from the internal combustion engine. For example, a boost pressure sensor can be used to send a signal to the electric control 54 when the engine is operating at low speed and load; and when the engine is called upon to accelerate, the boost pressure sensor, and/or a throttle sensor, can generate an input signal 56 to control 54, and the motor 45 for charge air compressor 42 and the motor 67 assisting rotation of the turbocharger compressor 64 can both be energized to provide increased air supply during the acceleration period. When the internal combustion engine 10 provides exhaust gas with sufficient energy to operate the turbocharger fast enough to provide an adequate charge air supply to the engine, an engine speed signal from the internal combustion engine can de-energize both the charge air compressor 42 and the assisting electric motor 67 of the turbocharger. Alternatively, at high engine speed and load when maximum power output is required, the assisting electric motor 67 for turbocharger 62 can be energized by control 54 and motor-driven compressor 42 can remain energized to provide high boost pressure.

When control 54 de-energizes both motor 45 for the charge air compressor 42 and the assisting electric motor 67 of turbocharger 62 in the high speed range of the engine (where the exhaust gas energy is sufficient to drive the turbocharger compressor to arrive at charge air and boost pressure needed by the engine,) the charge air check valve 50 opens conduit 47 by the flow of charge air from ambient atmosphere through the second charge air conduit 47 to the inlet 65 of the turbocharger compressor 64. As in charge air system 40 of FIG. 1, charge air system 60 of FIG. 2 avoids the restrictive effect of the small turbocharger compressor 42 by allowing ambient air to flow in an unrestricted fashion through check valve 50 to the inlet 65 of the turbocharger compressor 64. In addition, as shown in the charge air system 40 of FIG. 1, the second charge air conduit and air inlet of the charge air compressor 42 preferably obtain their air input through a charge air filter 52.

The assisting electric motor 67 and its connection with the electric control 54 are shown in dashed lines in FIG. 2 to indicate that while they represent part of a preferred embodiment, they are not necessary to the invention of charge air system 60.

Figure 3:
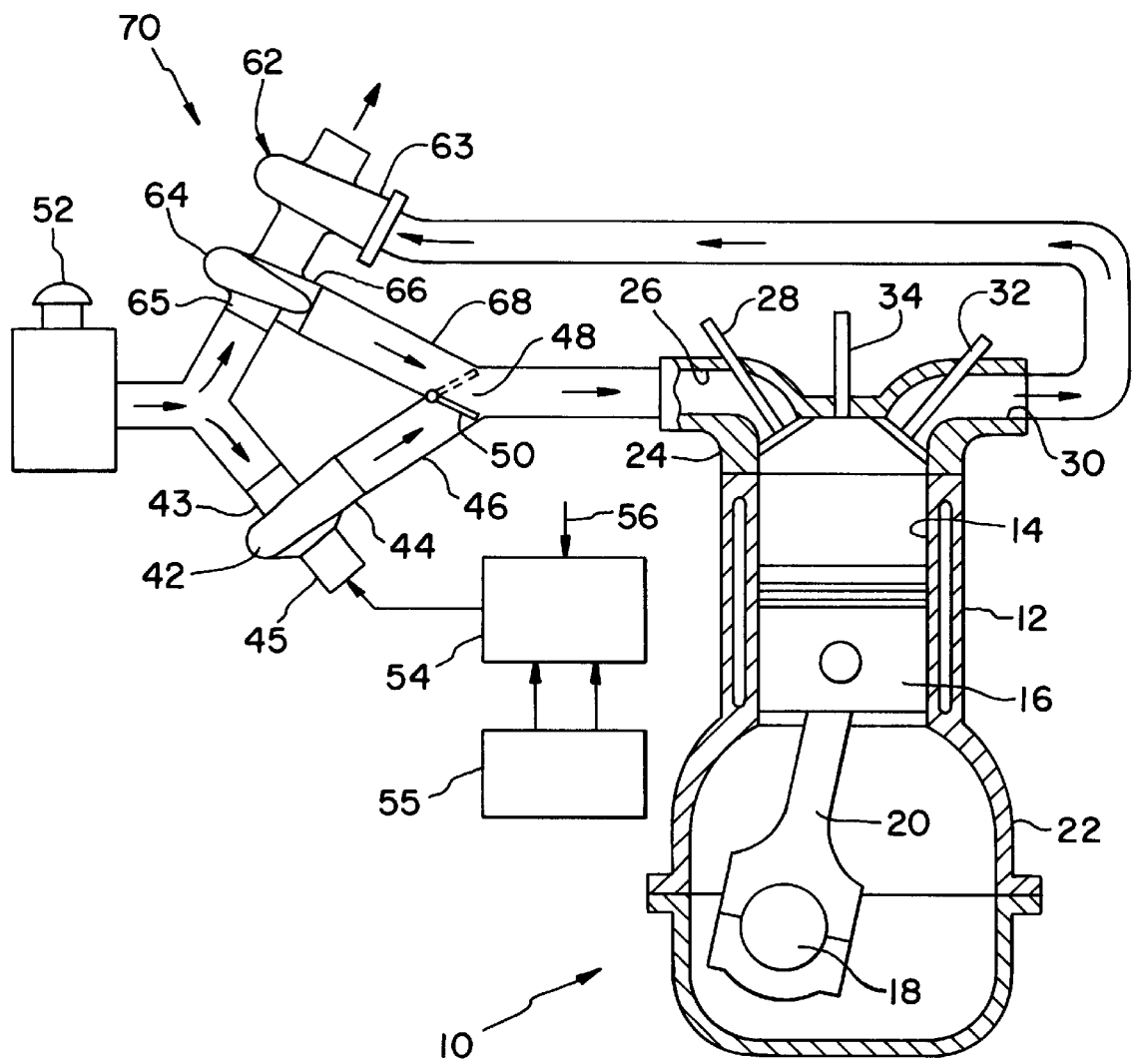
FIG. 3 shows schematically a third preferred embodiment of a charge air system of this invention for a four-cycle engine where a small motor-driven compressor is placed in parallel with a turbocharger compressor and charge air can be supplied from the small motor-driven compressor at low engine speeds and from the turbocharger compressor at high engine speeds.

A third preferred embodiment of charge air systems of the invention is shown in FIG. 3. The charge air system 70 of FIG. 3 uses a motor-driven compressor 42 and turbocharger 62 in a parallel arrangement for charging the four-cycle internal combustion engine 10 through a charge air check valve 50 connected in swing valve fashion.

The charge air system 70 of FIG. 3 includes a charge air compressor 42 having an inlet 43 and an outlet 44, an electric motor 45 connected to drive the charge air compressor 42 and a first charge air conduit 46 connected with the outlet of the charge air outlet 44 of charge air compressor 42. The turbocharger 62 includes an exhaust gas driven turbine 63 connected with the exhaust gas outlet 30 of the internal combustion engine 10, and a turbocharger compressor 64 having an air inlet 65 and a compressed air outlet 66 connected with the second charge air conduit 68. The charge air system 70 further includes a junction 48 connected with the first charge air conduit 46 and the second charge air conduit 68. The junction 48 is connected with the air inlet 26 of the intake manifold 24 of the internal combustion engine and a charge air check valve 50 is located at the junction for closing one of the first and second charge air conduits 46, 68. In operation of the charge air system 70, charge air check valve 50 operates as a swing valve and closes the second charge air conduit 68 upon operation of the charge air compressor 42 at low engine speeds of the four-cycle internal combustion engine (as shown in dashed lines) and closes the first charge air conduit 46 upon operation of the turbocharger 62 at high engine speeds of the four-cycle internal combustion engine.

In preferred operation of the charge air system 70, at engine idle and during acceleration the motor-driven compressor 42 is energized by the electric control 54 and electric motor 45, and the compressed charge air from charge air compressor outlet 44 swings the charge air check valve 50 to the position shown in dashed lines in FIG. 3 closing the second charge air conduit 68, and is conducted from the junction 48 to the charge air inlet 26 of the internal combustion engine 10. Once sufficient exhaust gas energy is supplied from the internal combustion engine to the turbocharger, for example, at engine speeds of about 2000 rpm to about 2500 rpm, the motor-driven compressor 42 can be de-energized and the turbocharger compressor 64 supplies charge air and boost pressure moving the charge air check valve 50 to the position shown in solid lines in FIG. 3 to close the first charge air conduit 46 and supply compressed charge air from the junction 48 to the air inlet 26 of the internal combustion engine 10. As with the charge air systems described earlier, control 54 can energize the electric motor 45 driving the charge air compressor 42 at low engine speeds and in response to demands for acceleration from low engine speed by a signal 56 which can be taken from an engine speed sensor and/or an acceleration demand sensor (not shown). As shown in FIG. 3, preferably the air inlet 43 for the charge air compressor 42 and the air inlet 65 for the turbocharger compressor 64 are connected with an air cleaner 52.

The parallel connection of the small electric motor-driven compressor and turbocompressor as shown in FIG. 3 can improve the performance of a turbocharged four-cycle engine by compensating for the time lag of the turbocharger compression 64 upon sudden throttle opening by providing the charge air output of the small charge air compressor 42, which is connected directly to the air intake 26 of the internal combustion engine 10 through the swing valve 50.

Back flow of compressed air from a junction 48 into second conduit 68 is prevented by the pressure-activated charge air check valve 50. When sufficient speed is obtained by the turbocompressor 64 its pressure output will overcome the check valve 50 allowing its compressed air to enter the junction 48 and the air inlet 26 of the internal combustion engine, and back flow of air from the junction 48 through the first charge air conduit 46 and the small charge air compressor 42 is prevented by the closure of this passage by swing valve 50.

Figure 4:
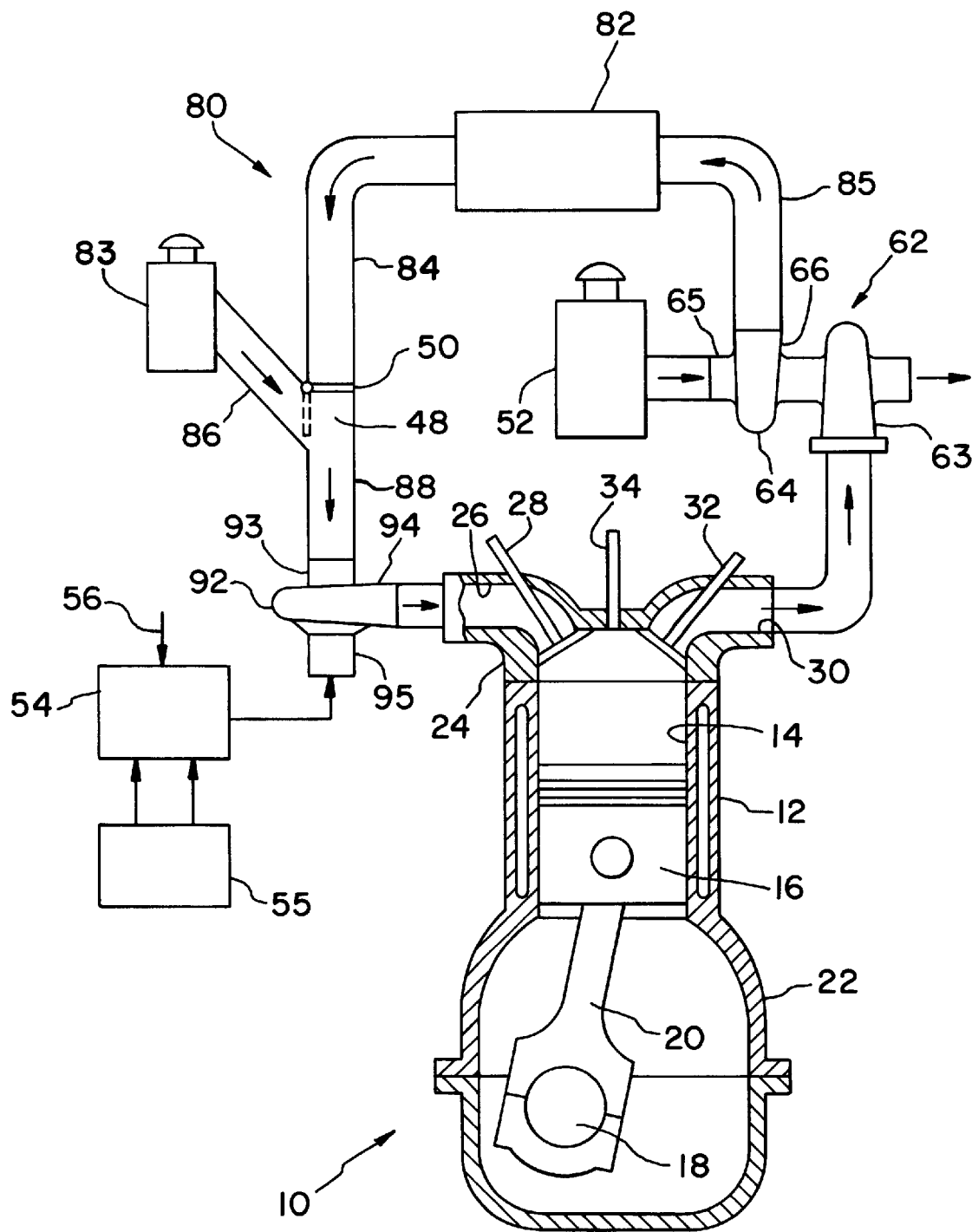
FIG. 4 shows a fourth preferred embodiment of the invention including a turbocharger charge air compressor and charge air cooler connected with the turbocharger charge air compressor, and series connected with a small motor-driven compressor so charge air can be provided by the small motor-driven compressor alone at low engine speeds and from the turbocharger compressor and small motor-driven compressor in a two-stage intercooled system at high engine speeds.

FIG. 4 shows a fourth preferred charge air embodiment of the invention 80 in which the compressed charge air output of a turbocharger compressor 64 is conveyed through an aftercooler 82, such as the air-to-air intercoolers used in turbocharged internal combustion engine systems, and hence to the air input 43 of charge air compressor 92 to provide a series arrangement and two-stage compression of charge air for the internal combustion engine 10. The charge air system 80 of FIG. 4 includes, in addition to air cleaner 52, an auxiliary air cleaner 84 and a charge air check valve 50 that allows the motor-driven compressor 92 to supply charge air to internal combustion engine 10 from ambient atmosphere immediately upon being energized without the restrictions that may be imposed by air cleaner 52, turbocharger compressor 64, aftercooler 82 and the associated conduits.

The charge air system 80 of FIG. 4 comprises a charge air compressor 92 having an air inlet 93 and an outlet 94, an electric motor 95 connected to drive the charge air compressor 92 and a turbocharger 62 having an exhaust gas driven turbine 63 connected with the exhaust gas outlet 30 of the internal combustion engine 10, and a turbocharger compressor 64 having air inlet 65 and a compressed charge air outlet 66 which is connected to the inlet of charge air cooler 82. A further charge air conduit 84 is connected with the outlet of the cooler 82, and a second charge air conduit 86 is connected with ambient atmosphere, and the further charge air conduit 84 and the second charge air conduit 86 are connected at junction 48 which is connected by a third charge air conduit 88 with the inlet 93 of the charge air compressor 92. A charge air check valve 50 operates upon operation of the charge air compressor 92 to open the second charge air conduit 86 so charge air can be supplied from ambient atmosphere through the auxiliary air cleaner 84 to the inlet 93 of charge air compressor 92 for compression and delivery to the air inlet 26 of the internal combustion engine 10. Charge air check valve 50 operates to close the second charge air conduit 86 when the turbocharger 62 is operated by the internal combustion engine at high engine speeds.

Unlike the charge air systems of FIGS. 1–3, however, the charge air compressor 92 must be operated by the control at high engine speeds to avoid restricting the flow of charge air from the turbocharger compressor 64 to the air inlet 26 of the internal combustion engine. However, the use of a motor-driven compressor 92 in combination with the check valve 50 and ambient air conduit 86 permits the internal combustion engine to be supplied with a more rapid increase in boost pressure for acceleration.

As suggested by FIG. 4, the charge air compressor 92 can be mounted closely adjacent the intake manifold 26 of the internal combustion engine and can eliminate the restrictive impact of air cleaner 52, turbocharger compressor 64, aftercooler 82 and conduits 84 and 85. In operation of the charge air system 80, centrifugal compressor 92 can be driven by electric motor 45 in response to control 54 at predetermined minimum speed to provide boost pressure to the engine intake manifold at engine idle and at low load and speed conditions. Thus, in such operation a significant amount of charge air and boost pressure can be present at the air inlet 26 of the internal combustion engine before additional fuel is injected as engine acceleration is demanded by the engine operator. In addition, the charge air compressor 92 can be super-energized by control 54 and electric motor 45 upon receipt of an acceleration demand signal 56, and the charge air compressor 92 can respond rapidly in response to such super-energization to provide rapid increases in charge air and boost pressure at the intake manifold 24 when acceleration of the engine is demanded.

Due to the higher charge air provided by charge air systems of the invention when engine acceleration is called for, engine acceleration can be increased, fuel burned more completely, and harmful pollutants in the engine and exhaust substantially reduced. As it will be apparent to those skilled in the art, the signal 56 for operation of charge air systems of the invention may be taken from any one or more of intake manifold pressure, engine speed, acceleration demand sensors and other appropriate sensors of engine load and operation.

While FIGS. 3 and 4 does not indicate that the turbocharger compressor 62 includes an assisting electric motor, an assisting electric motor controlled from control 54 can be provided in the charge air system 70 if desired.

Thus, the charge air systems of the invention permit the charge air requirements of the internal combustion engine to be provided rapidly in response to demands for engine acceleration through the use of small electric motor-driven compressors and without imposing restrictions on charge air flow that may otherwise may be imposed upon the charge air system by such small charge air compressors, and the invention permits such systems to utilize two-stage charge air compression through the additional use of a turbocharger compressor, or a larger electric motor-driven compressor, and permit a supply of charge air from parallel operation of small motor-driven compressor and a turbocharger compressor, or a larger motor-driven compressor.

While this invention has been described in several currently best known modes, it will be clear to those skilled in the art that the invention may embodied in other modes and embodiments. Accordingly, the scope of the invention is defined by the following claims.

What is claimed is:

1. A two stage charge air system for an internal combustion engine, said internal combustion engine having an exhaust gas manifold and an intake air manifold, comprising:

a first stage charge air compressor capable of supplying less than about one-third of the charge air requirements of the internal combustion engine operating at full rated speed and load, said first stage charge air compressor having an air inlet and a compressed air outlet;

an electric motor for driving said first stage charge air compressor;

a first charge air conduit connected with the compressed air outlet at one end and a junction at the other end;

a second charge air conduit connected with the junction at one end and open to atmosphere at the other end;

a pressure activated check valve for the second charge air conduit adjacent the junction;

a turbocharger, having an exhaust gas driven turbine connected with the exhaust gas manifold of the internal combustion engine and a second stage charge air compressor driven by the exhaust gas turbine, said second stage charge air compressor of the turbocharger, having a charge air outlet connected with the air intake manifold of the internal combustion engine, and an air inlet connected with the junction of the first and second charge air conduits; and a control for the two stage charge air system, said control being connected with an internal combustion engine speed sensor and an engine acceleration demand sensor and having an output for energizing the first stage electric motor in the presence of an engine acceleration demand signal and de-energizing the first stage electric motor above a predetermined engine operating speed.

2. The two stage charge air system of claim 1 wherein a turbocharger electric motor assists the exhaust gas turbine in driving the second stage charge air compressor of the turbocharger, and the control has a second output energizing the turbocharger electric motor in the presence of an engine acceleration demand signal and de-energizing the turbocharger electric motor above a predetermined engine operating speed.

3. The charge air system of claim 1 wherein the pressure activated check valve closes said second charge air conduit upon operation of said first stage charge air compressor, and closes said first charge air conduit upon operation of said turbocharger at high engine speeds of said internal combustion engine.

4. The charge air system of claim 1 wherein the said air inlet of the charge air compressor and said air inlet of the turbocharger compressor are connected with an air cleaner.

* * * * *